Nov. 10, 1936.   O. MASSEY   2,060,740
TRACTOR GUIDE
Filed June 16, 1936   2 Sheets-Sheet 1
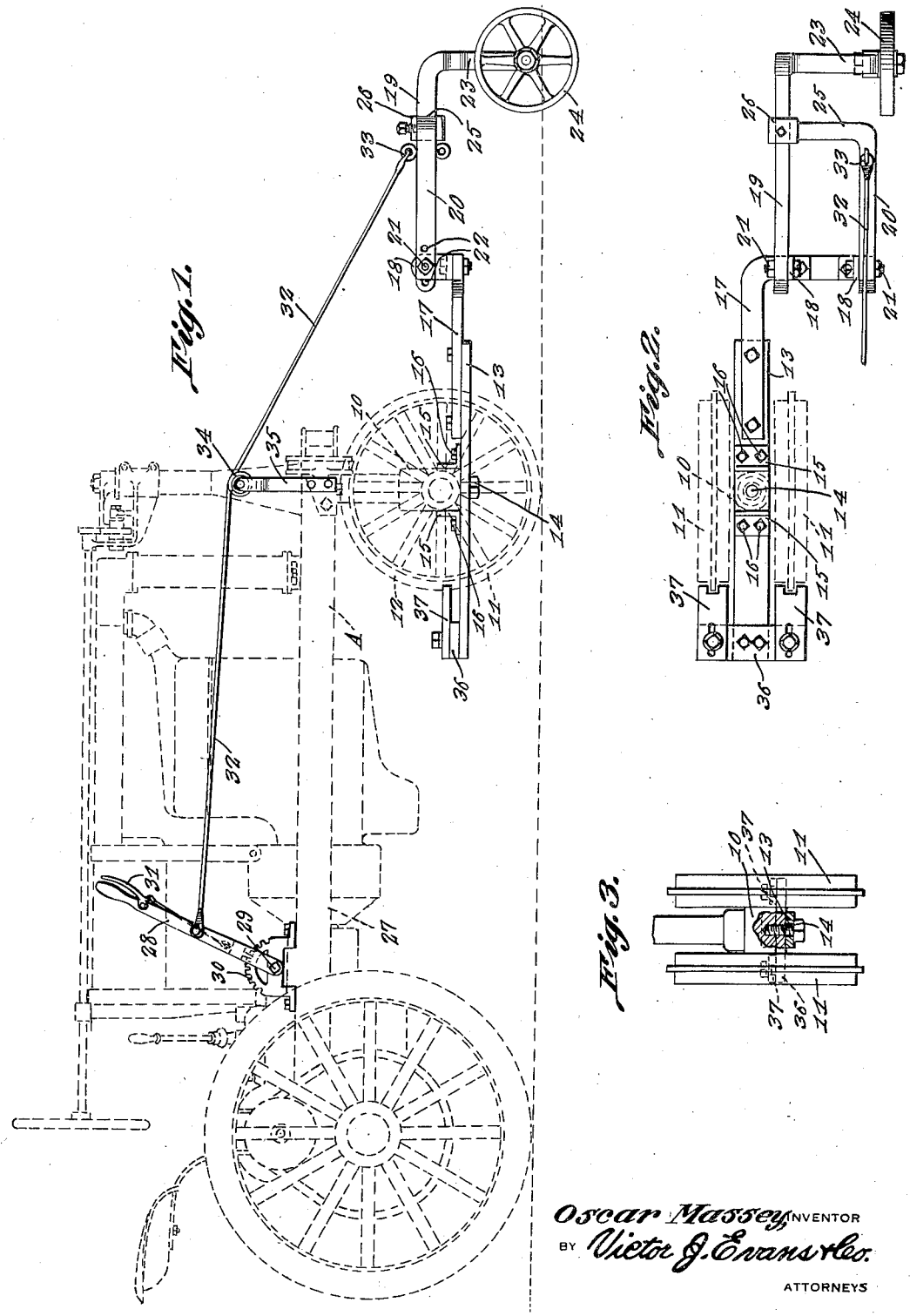
Oscar Massey, INVENTOR
BY Victor J. Evans & Co.
ATTORNEYS

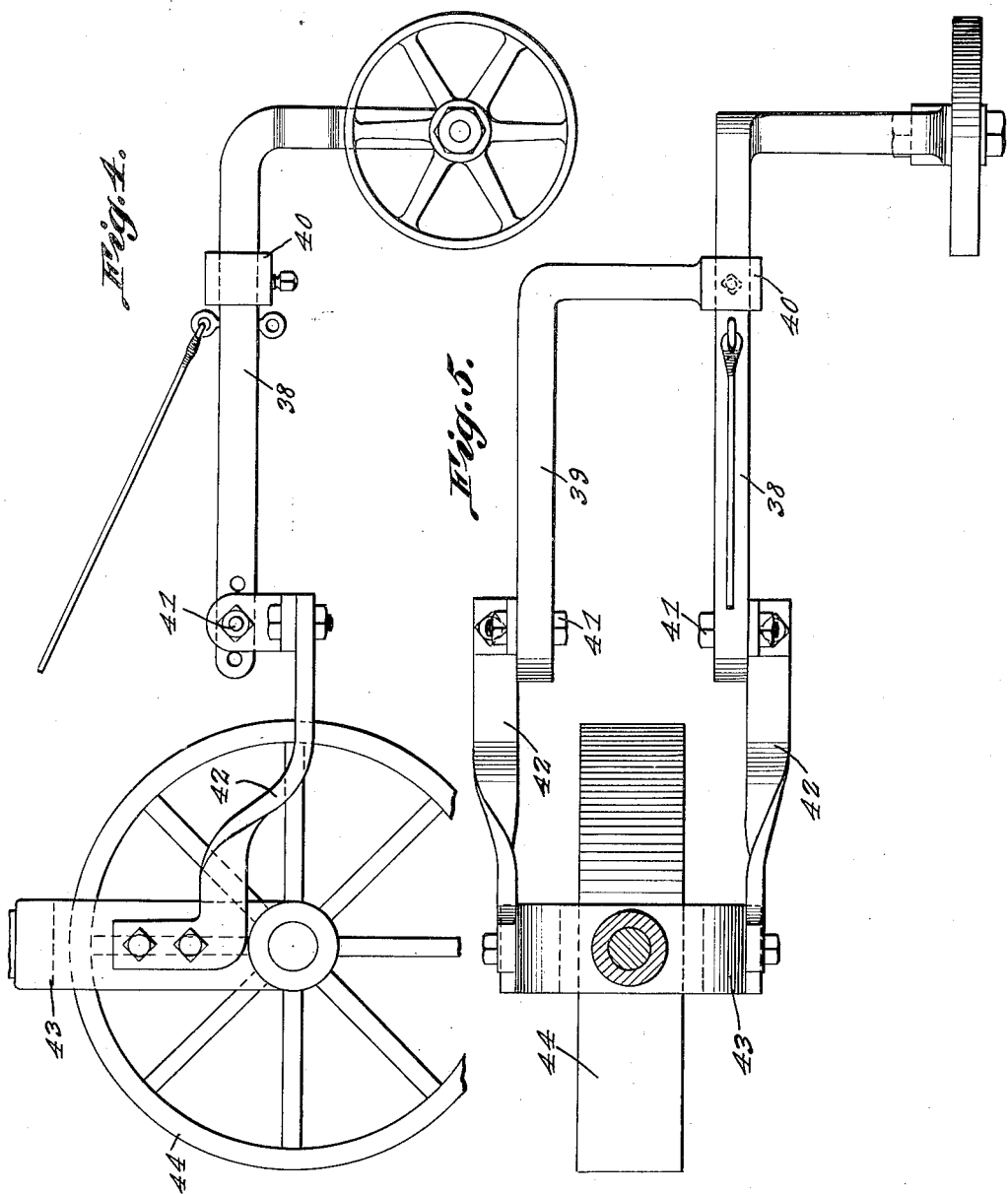

Patented Nov. 10, 1936

2,060,740

UNITED STATES PATENT OFFICE 2,060,740

TRACTOR GUIDE

Oscar Massey, Clinton, Ill.

Application June 16, 1936, Serial No. 85,615

1 Claim. (Cl. 97—49)

The invention relates to a tractor attachment and more especially to a wheeled guide for a tractor.

The primary object of the invention is the provision of a guide of this character wherein the same when attached to a tractor will serve to guide the tractor in its advancement over a field or the like, particularly when planting or when plowing soil, the guide being of novel construction and can be manually controlled to have the same assume an active or inactive position.

Another object of the invention is the provision of a guide of this character wherein the construction thereof is novel in form so that it can be readily and conveniently attached to the steering fork or head of a tractor and when not in use can be raised to be out of the way and when in use for guiding purposes will be lowered for contact with the ground.

A further object of the invention is the provision of a guide of this character which is simple in construction, thoroughly reliable and efficient in its operation, readily and easily attached to and removed from a tractor, manually controlled and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a side elevation of the tractor guide constructed in accordance with the invention shown applied to a tractor and in working position.

Figure 2 is a top plan view thereof showing the cleaner accessory associated therewith.

Figure 3 is an elevation partly in section showing in detail the mounting of the guide upon the tractor.

Figure 4 is a side elevation of a modified form of guide.

Figure 5 is a top plan view thereof.

Similar reference characters indicate corresponding parts throughout the several views in the drawings.

Referring to the drawings in detail, particularly to Figures 1 to 3 inclusive, A designates generally a tractor which is of standard type having a front bearing 10 for the axle of the front steering wheels 11, the latter being peripherally flanged at 12 as is usual. Fitted to the bearing 10 is the guide constituting the present invention and hereinafter fully described.

This guide comprises an elongated beam 13 which is disposed beneath the bearing 10 so that the latter will be located mid-way of the length of the said beam and the latter is made fast to the bearing by bolt 14 and brackets 15. Two brackets 15 are employed, one disposed forwardly and the other rearwardly of the bearing 10. These brackets are made fast to the beam 13 by fasteners 16. Secured to the forward end of the beam is a laterally projected L-shaped arm 17, it having rising therefrom spaced pivot ears 18 for main and auxiliary hangers 19 and 20 respectively which are swingingly connected to said ears 18 by pivots 21. The pivots 24 are selectively adjustable in holes 22 in the hangers 19 and 20.

The hanger 19 has a downwardly and laterally outwardly bent end 23 upon which is journaled a guide wheel 24. The auxiliary hanger 20 is formed with an inwardly directed elbow 25 having the coupling 26 with the main hanger 19.

The guide wheel 24 is laterally offset to one side of the tractor A and when in contact with the ground will serve as a guide for the tractor.

Upon the chassis 27 of the tractor A is a swinging throw lever 28 which is pivoted at 29 to a keeper segment 30, the latter being equipped with a hand released latch 31 for engaging the keeper 30 and in this manner locking the lever in an adjusted position. Connected with the lever 30 is a raising and lowering cable 32 which is also connected at 33 to the auxiliary hanger 20 and this cable 32 is trained over a pulley 34 journaled in a bracket 35 mounted upon the chassis 27 fore of said tractor A. Thus it will be seen that when manipulating the lever 38 in one direction, the guide wheel 24 can be elevated from the ground to be held inactive for guiding purposes and on movement of the lever in reverse direction, the wheel will be brought into contact with the ground for service as a guide for the tractor.

On the rear end of the beam 13 is a cross piece 36 upon which are adjustably bolted scrapers 37, these being for the purpose of scraping the treads of the wheels 11, keeping the same clean during the servicing of the tractor A.

In Figures 4 and 5 of the drawings there is shown a modification of guide wherein the main and auxiliary hangers 38 and 39 which are coupled together at 40 and pivoted for vertical swinging movement at 41 are supported from brackets 42 affixed to a single steering wheel fork 43 for the steering wheel 44.

In the use of the guide the wheel 24 is lowered into a furrow so that the tractor will be properly guided to have furrows formed in the ground parallel with each other and uniformly spaced in their parallel relation to each other.

It is of course understood that the tractor has fitted thereto ground-working machinery or implements either for planting or plowing purposes or otherwise.

What is claimed is:

A tractor guide comprising a guide wheel for traction upon ground, a mounting for attachment to a steering head of a tractor and supporting the wheel laterally offset to one side of the line of draft of said tractor, means included in said mounting for permitting the raising and lowering of the wheel, means on a tractor for operating the first named means and adapted for latching and adjusted position, and means associated with the mounting for cleaning of a front steering wheel of said tractor.

OSCAR MASSEY.